(12) United States Patent
Richardson et al.

(10) Patent No.: US 9,429,323 B2
(45) Date of Patent: Aug. 30, 2016

(54) COMBUSTION LINER WITH BIAS EFFUSION COOLING

(71) Applicants: Brian Richardson, Jupiter, FL (US); Khalid Oumejjoud, Palm Beach Gardens, FL (US); John Cutright, Stuart, FL (US); Nikki McMullen, Stuart, FL (US); Peter John Stuttaford, Jupiter, FL (US); Richard Parker, West Palm Beach, FL (US); Sumit Soni, Jupiter, FL (US)

(72) Inventors: Brian Richardson, Jupiter, FL (US); Khalid Oumejjoud, Palm Beach Gardens, FL (US); John Cutright, Stuart, FL (US); Nikki McMullen, Stuart, FL (US); Peter John Stuttaford, Jupiter, FL (US); Richard Parker, West Palm Beach, FL (US); Sumit Soni, Jupiter, FL (US)

(73) Assignee: General Electric Technology GMBH, Baden (CH)

( * ) Notice: Subject to any disclaimer, the term of this patent is extended or adjusted under 35 U.S.C. 154(b) by 113 days.

(21) Appl. No.: 14/278,770

(22) Filed: May 15, 2014

(65) Prior Publication Data

US 2015/0330634 A1    Nov. 19, 2015

(51) Int. Cl.
*F23R 3/04* (2006.01)
*F23R 3/00* (2006.01)
*F23R 3/06* (2006.01)

(52) U.S. Cl.
CPC ............. *F23R 3/04* (2013.01); *F23R 3/002* (2013.01); *F23R 3/06* (2013.01); *F23R 2900/03041* (2013.01); *Y02T 50/675* (2013.01)

(58) Field of Classification Search
CPC   F23R 3/06; F23R 3/002; F23R 2900/03042; F23R 2900/03041
See application file for complete search history.

(56) References Cited

U.S. PATENT DOCUMENTS

| | | | |
|---|---|---|---|
| 4,923,371 A | 5/1990 | Ben-Amoz | |
| 5,233,828 A | 8/1993 | Napoli | |
| 5,241,827 A | 9/1993 | Lampes | |
| 6,205,789 B1 | 3/2001 | Patterson et al. | |
| 6,393,828 B1 * | 5/2002 | Zhao | C23C 4/00 428/614 |
| 7,269,957 B2 * | 9/2007 | Martling | F01D 9/023 60/752 |
| 7,905,094 B2 | 3/2011 | Dudebout et al. | |
| 8,104,288 B2 * | 1/2012 | Woodcock | F23R 3/06 60/752 |
| 8,171,634 B2 | 5/2012 | Rudrapatna et al. | |
| 8,650,882 B2 | 2/2014 | Woolford et al. | |

\* cited by examiner

*Primary Examiner* — Phutthiwat Wongwian
*Assistant Examiner* — Stefan Ibroni
(74) *Attorney, Agent, or Firm* — Shook, Hardy & Bacon, L.L.P.

(57) ABSTRACT

A system and method for improving the cooling to a portion of a combustion liner of a gas turbine combustor is disclosed. The combustion liner is cooled by supplying air through a plurality of cooling holes arranged in axially spaced rows in an upper and lower portion of the liner. The cooling holes are spaced accordingly so as to direct additional cooling flow to an area of the combustion liner not receiving sufficient flow due to maldistributions of air from the compressor discharge.

20 Claims, 10 Drawing Sheets

COMBUSTION LINER WITH BIAS EFFUSION COOLING

CROSS-REFERENCE TO RELATED APPLICATIONS

None.

TECHNICAL FIELD

The present invention generally relates to a gas turbine combustor. More specifically, embodiments of the present invention relate to an apparatus and method for improving the cooling of a combustion liner in order to improve component integrity and operating life.

BACKGROUND OF THE INVENTION

In a typical gas turbine engine, a compressor having alternating stages of rotating and stationary airfoils is coupled to a turbine through an axial shaft, with the turbine also having alternating stages of rotating and stationary airfoils. The compressor stages decrease in size in order to compress the air passing therethrough. The compressed air is then supplied to one or more combustors, which mixes the air with fuel. An ignition source in the combustor ignites the mixture, forming hot combustion gases, which then pass through the turbine, expanding and driving the stages of a turbine, which is coupled to the compressor through the axial shaft. The exhaust gases can then be used as a source of propulsion, to generate steam through a heat recovery steam generator, or in powerplant operations to turn a shaft coupled to a generator for producing electricity.

The combustion system of a gas turbine engine can take on a variety of configurations. A combustion system for a gas turbine engine can comprise a single combustion chamber, a plurality of individual combustion chambers spaced about the axis of the engine, a plenum-type combustion system, or a variety of other combustion systems. Depending on the engine geometry, performance requirements, and physical operating location, the exact combustor arrangement will vary.

A typical combustion system generally comprises at least a casing secured to the frame of the engine, a combustion liner secured within at least a part of the casing, and one or more fuel nozzles positioned within or adjacent to the combustion liner for injecting a fuel (gas, liquid, or both) into the combustion chamber. The combustion system is in fluid communication with the engine as the casing and liner arrangement provides a way for air from the compressor to enter the combustion system, where it mixes with fuel from the one or more fuel nozzles. The fuel-air mixture is ignited by an ignition source, such as a spark igniter. Hot combustion gases travel through the combustion liner and often through one or more transition pieces and into the turbine. The transition piece is essentially a duct having a geometry that changes from the shape of the combustor to the inlet of the turbine.

The combustion liner is at the center of combustor operations. The combustion liner geometry is dictated by the operating parameters of the engine, performance requirements, and/or available geometry. While combustion liner geometries can vary, the combustion liner typically includes regions for receiving fuel nozzles, for mixing fuel and air together, and for containing the reaction when the fuel and air mixture is ignited.

Due to the operating temperatures within the combustion liner, it is necessary to cool the combustion liner. Cooling air is typically provided along the outer surface of the combustion liner and often times through the wall thickness and along at least a portion of the inner wall of the combustion liner. However, a non-uniform distribution of cooling air around the combustion liner can lead to non-uniform cooling, which can cause adverse and undesirable consequences to the structural integrity of the combustion liner.

SUMMARY

In accordance with the present invention, there is provided a novel and improved way of cooling a combustion liner in order to improve the cooling effectiveness and reduce the misdistribution of the cooling air. In an embodiment of the present invention, a combustion liner is provided having a generally annular body where the annular body has an upper portion and a lower portion, where the lower portion is a part of the combustion liner located closest to an engine centerline. The combustion liner also comprises a plurality of openings located in the generally annular body and a seal positioned along the outer wall near the outlet end. The combustion liner also comprises a plurality of cooling holes in the annular body arranged in a plurality of axially spaced rows, where a first set of axially spaced rows is located in the upper portion, a second set of axially spaced rows is located in the lower portion, and a third set of axially spaced rows are also located in the lower portion such that the lower portion of the annular body has a higher concentration of cooling holes than the upper portion.

In an alternate embodiment of the present invention, a cooling pattern for a combustion liner is provided. The cooling pattern comprises a first set of axially spaced rows of cooling holes located in an upper portion of the combustion liner, a second set of axially spaced rows of cooling holes located in the lower portion of the combustion liner, and a third set of axially spaced rows of cooling holes also located in the lower portion of the combustion liner. The third set of axially spaced rows of cooling holes are positioned between the axially spaced rows of cooling holes of the second set, thereby increasing cooling flow to the lower portion of the combustion liner.

In another embodiment of the present invention, a method of providing increased cooling to a portion of a combustion liner is provided. A generally annular body having an upper portion and a lower portion is provided. A first plurality of rows of cooling holes are provided in the upper portion, while a second plurality of rows of cooling holes are provided in the lower portion, where the second plurality of rows are in axial alignment with the first plurality of rows. A third plurality of rows of cooling holes are also provided in the lower portion, where the third plurality of rows are positioned between the second plurality of rows, and the cooling holes in the second and third plurality of rows are spaced at a closer distance together than the cooling holes in the first plurality of rows.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
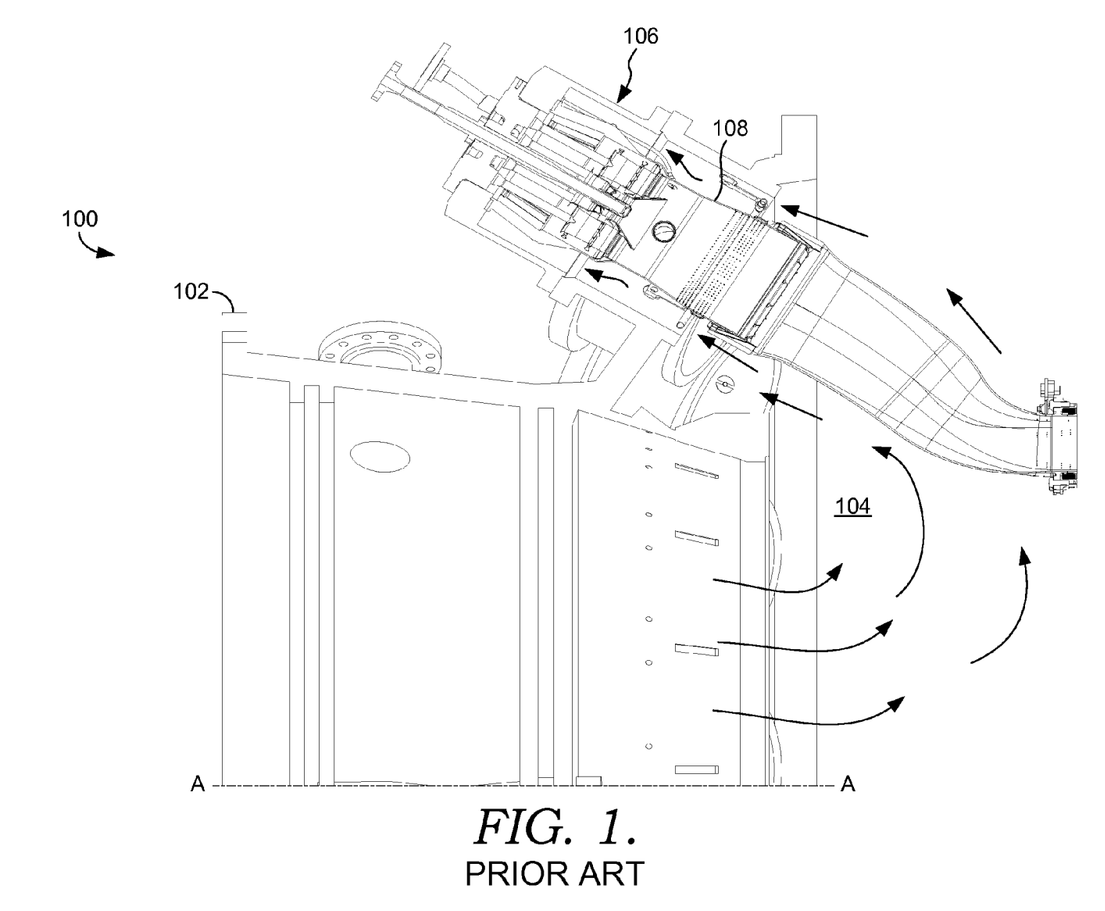
FIG. 1 is a partial cross section view of a gas turbine engine in which a combustion liner of the prior art operates and in which a combustion liner in accordance with an embodiment of the present invention is capable of operating.

Referring initially to FIG. 1, a portion of a gas turbine engine 100 of the prior art, and in which an embodiment of the present invention is capable of operating is depicted. The gas turbine engine 100, which operates through a shaft (not shown) extending along an engine axis A-A, includes a compressor case 102 and compressor (not shown) and a compressor discharge plenum 104. The shaft connects the compressor to the turbine. As generally discussed above, the compressor receives air through an inlet region and directs the air through alternating rows of rotating and stationary airfoils of decreasing size in order to compress the air passing therethrough, thereby increasing air temperature and pressure. The compressed air is then directed into the compressor discharge plenum 104, where it alters flow direction and is directed towards one or more combustion systems 106. Prior to the air entering the combustion system 106, the compressed air is used to cool the combustion liner 108. The compressed air then enters the combustion liner 108 and is mixed together with fuel and ignited to form hot combustion gases. The hot combustion gases are then directed into the turbine (not shown) and pass through alternating rows of rotating and stationary airfoils of increasing size so as to expand the fluid and harness the energy from the combustion gases into mechanical work to drive the shaft. The shaft may also be coupled to a shaft of an electrical generator (not shown) for purposes of generating electricity.

The flow of compressed air from the axial compressor to the compressor discharge plenum 104 is generally uniform, but the flow from the compressor discharge plenum 104 to the one or more combustion systems 106 can be non-uniform at least with respect to air distribution about the combustion liner 108. This can be due to a variety of factors such as the orientation and position of the combustion systems. As a result, the amount of air for cooling is not distributed uniformly to each of the combustion systems 106. Any uneven distribution of the compressed air typically resolves itself with respect to the combustion process, that is, by the time the air is injected into the combustion liner 108 and mixed with fuel.

Figure 2:
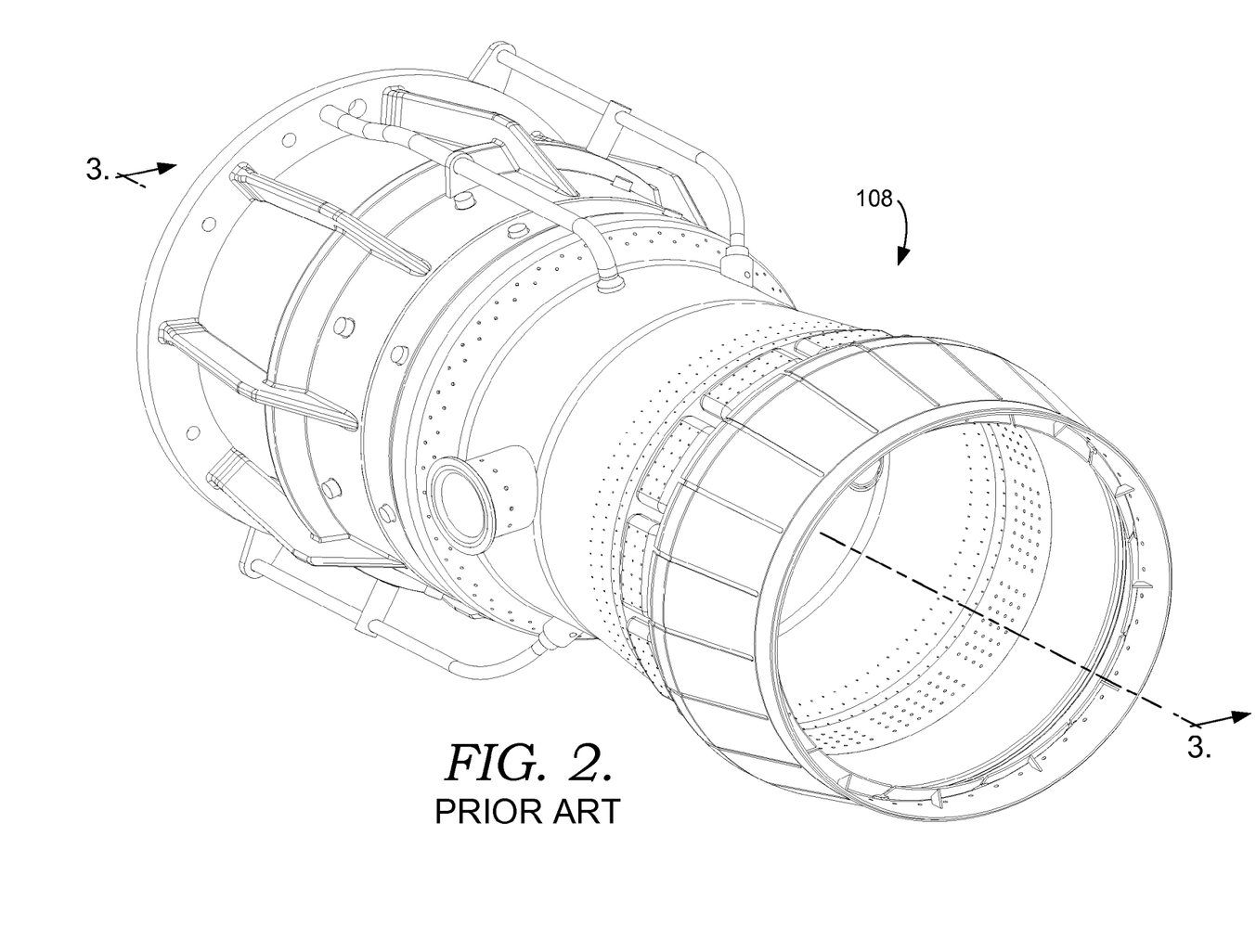
FIG. 2 is a perspective view of a combustion liner in accordance with the prior art.
Figure 3:
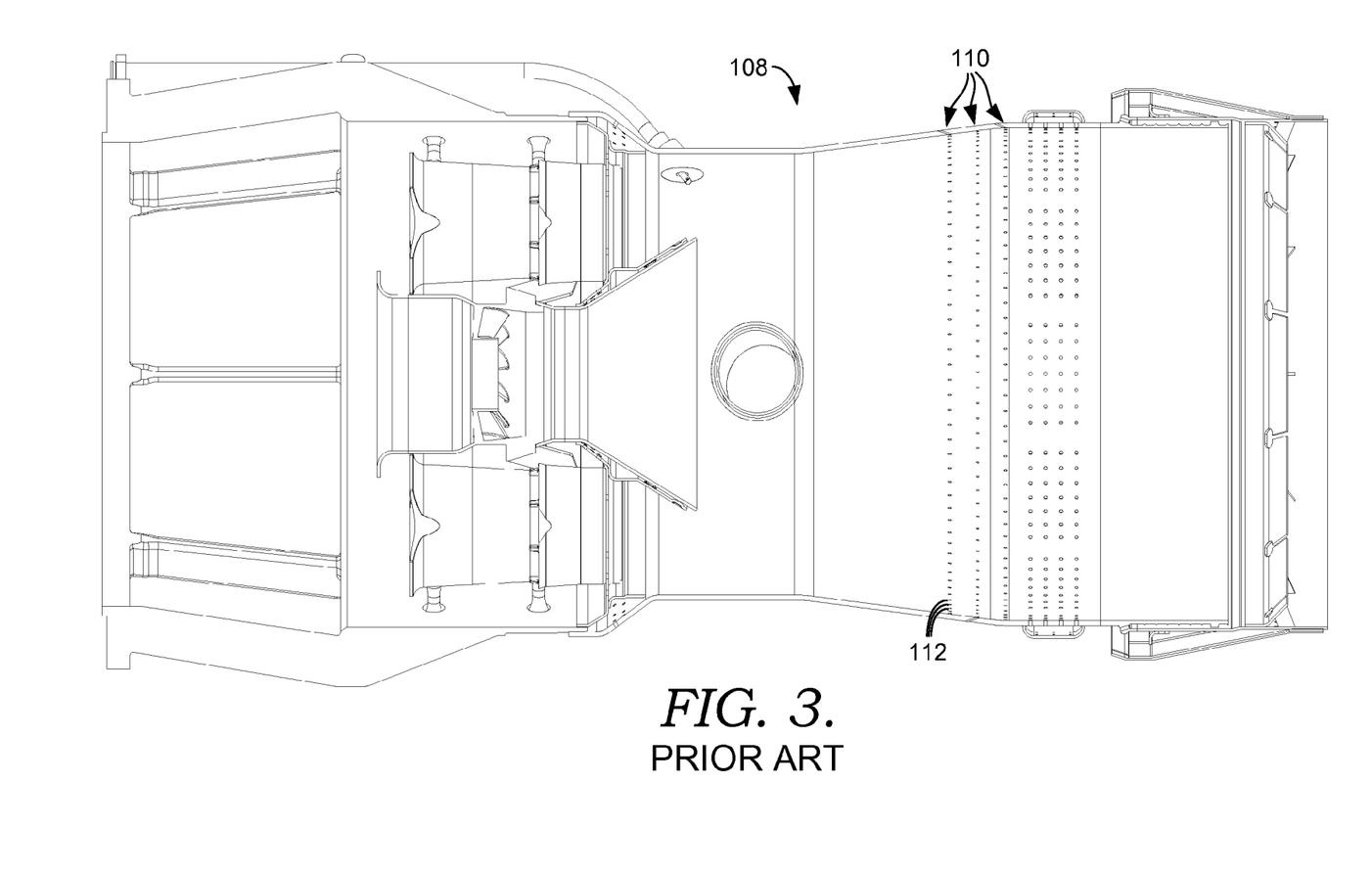
FIG. 3 is a cross section view of the combustion liner of FIG. 2 in accordance with the prior art.

However, the uneven air distribution for cooling purposes of the combustion liner 108 does present a problem. This is apparent with respect to the combustion liner 108 depicted in FIGS. 2 and 3. For the combustion liner 108 of the prior art, three axially spaced rows 110 of cooling holes 112 are utilized for cooling, where each of the rows 110 are equally spaced and contain an equal number of cooling holes 112 oriented in an axial direction having an equal diameter. The cooling holes 112 within each of the axially spaced rows 110 are equally spaced about the perimeter of the combustion liner 108 so as to provide an equal cooling flow to the combustion liner 108. However, where the supply of compressed air is non-uniform, an equal distribution of cooling holes does not provide an equal distribution of cooling air to the combustion liner 108.

Figure 4:
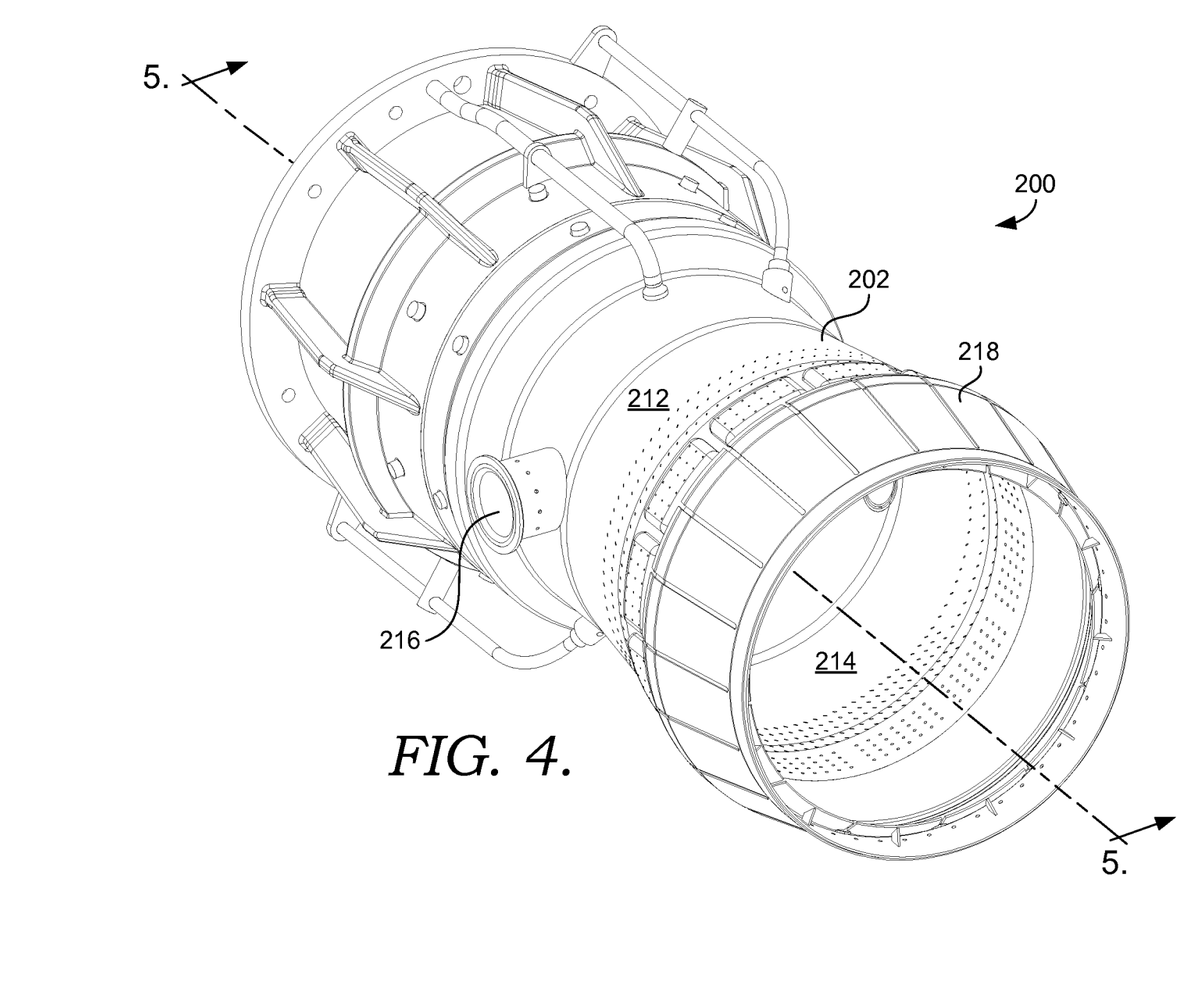
FIG. 4 is a perspective view of a combustion liner in accordance with an embodiment of the present invention.

The present invention is disclosed in FIGS. 4-9B. Referring initially to FIGS. 4 and 5A, a combustion liner 200 in accordance with an embodiment of the present invention is disclosed. The combustion liner 200 is capable of operating in a gas turbine combustor and gas turbine engine, as depicted in FIG. 1. The combustion liner 200 comprises a generally annular body 202 having a centerline B-B as shown in FIG. 5A, an inner wall 204, and an outer wall 206 spaced a distance from the inner wall 204 by the wall thickness of the generally annular body 202. The generally annular body 202 also has an inlet end 208 and an opposing outlet end 210.

The generally annular body 202 also has an upper portion 212 and a lower portion 214, where the upper portion 212 and lower portion 214 are determined based on how the combustion liner 200 is oriented in the gas turbine engine. That is, the lower portion 214 comprises a section of the generally annular body 202 that is positioned closer to the engine axis A-A, as shown in FIG. 1, upon installation of the combustion liner 200 in the gas turbine engine. Although the exact size of the lower portion 214 can vary depending on the engine type and size of the combustion system, for an embodiment of the present invention, the lower portion 214 encompasses approximately 120 degree section of the generally annular body 202. Typically, the lower portion 214 can extend between 30 degrees and 150 degrees. This lower portion section is more clearly shown in FIG. 6.

The upper portion 212 encompasses the remaining portion of the generally annular body 202. That is, for the embodiment of the present invention discussed above, the upper portion 212 encompasses approximately 240 degree section of the generally annular body 202.

The combustion liner 200 also comprises a plurality of openings 216 located in the generally annular body 202. These openings 202 are positioned between the inlet end 208 and outlet end 210. The plurality of openings 216 can perform a variety of functions such as large dilution holes or for connecting adjacent combustion liners via cross fire tubes, such as the openings 216 depicted in FIGS. 4-7. The combustion liner 200 also comprises a seal 218 positioned along the outer wall 206 and proximate the outlet end 210.

The combustion liner 200 also comprises a plurality of cooling holes 220 arranged in a plurality of axially spaced rows. More specifically, referring to FIGS. 5A-7, the combustion liner 200 has a first set of axially spaced rows 222 located in the upper portion 212 of the annular body 202 and a second set of axially spaced rows 224 located in the lower portion 214 of the annular body 202. The combustion liner 200 also includes a third set of axially spaced rows 226 also located in the lower portion 214 of the generally annular body 202. The plurality of axially spaced rows are arranged in a way such that the lower portion 214 of the generally annular body 202 has a higher concentration of cooling holes than the upper portion 212 of the generally annular body 202.

The plurality of cooling holes 220 and their respective locations in the combustion liner 200 can also be seen with respect to FIGS. 5B-9B. As it can be seen from FIGS. 5A and 5B, the first set of axially spaced rows 222 and the second set of axially spaced rows 224 each comprise at least three rows where the second set of axially spaced rows 224 are in axial alignment with the first set of axially spaced rows 222.

Figure 5A:
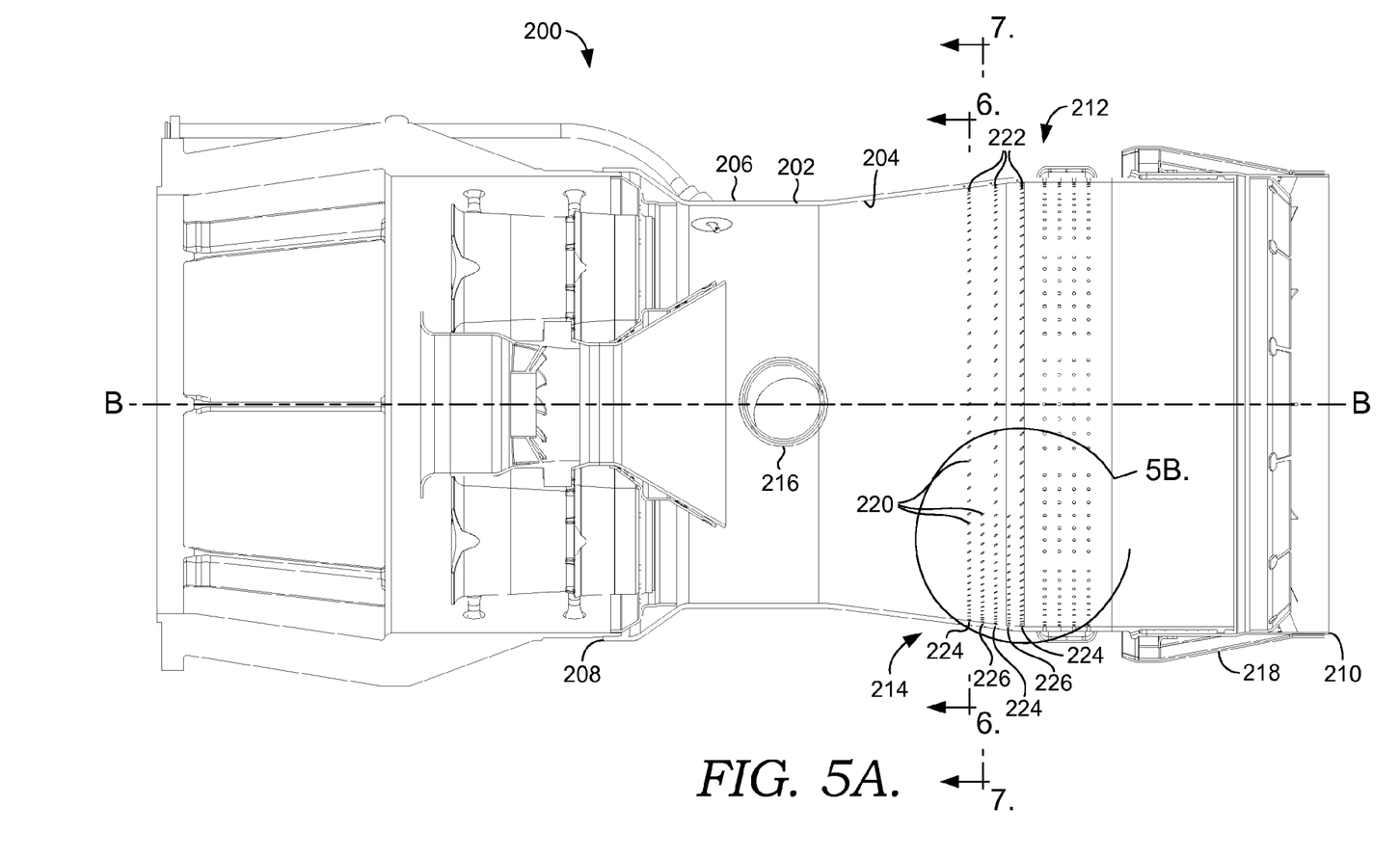
FIG. 5A is a cross section view of the combustion liner of FIG. 4 in accordance with an embodiment of the present invention.
Figure 5B:
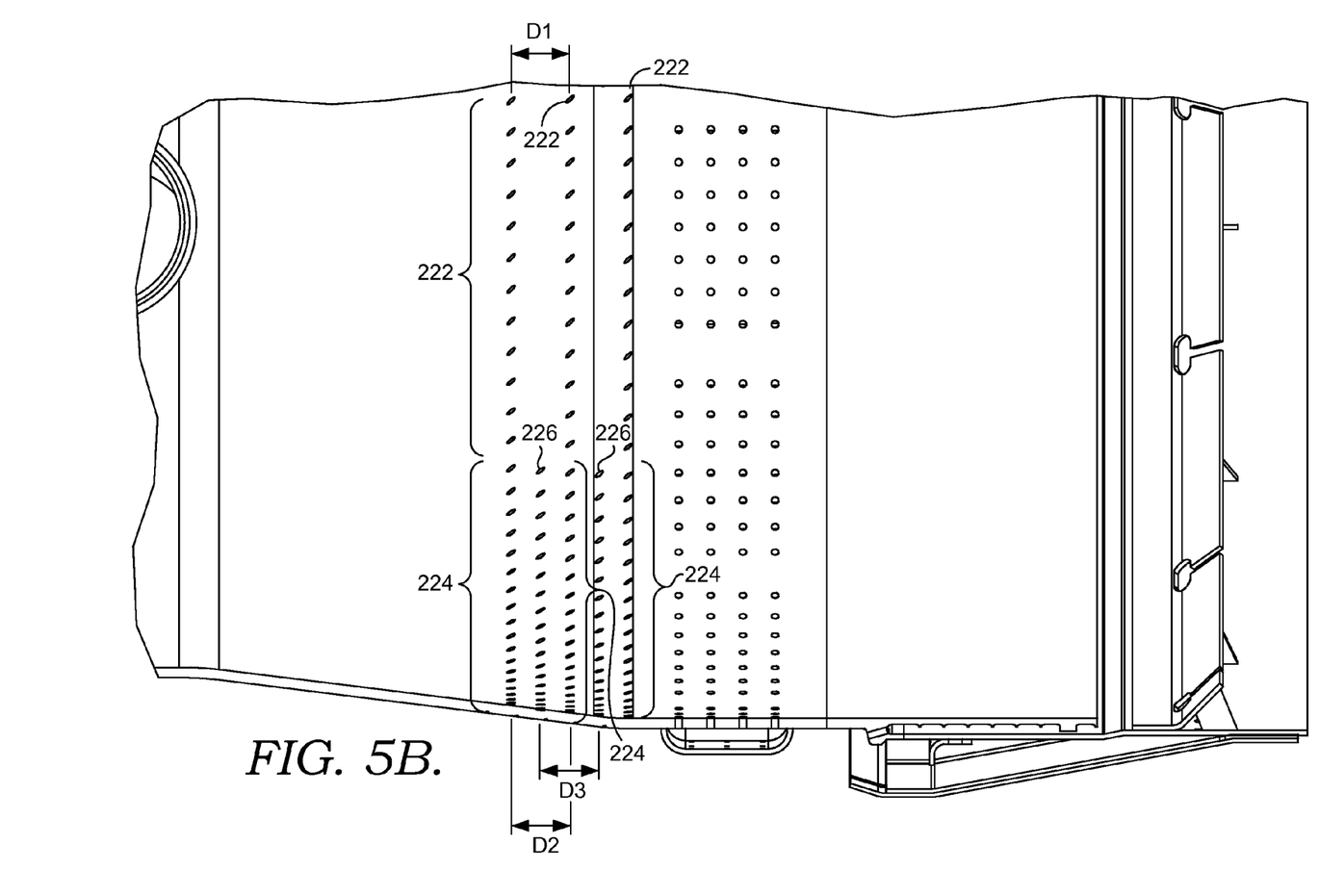
FIG. 5B is a detailed cross section view of a portion of the combustion liner of FIG. 5A in accordance with an embodiment of the present invention.
Figure 6:
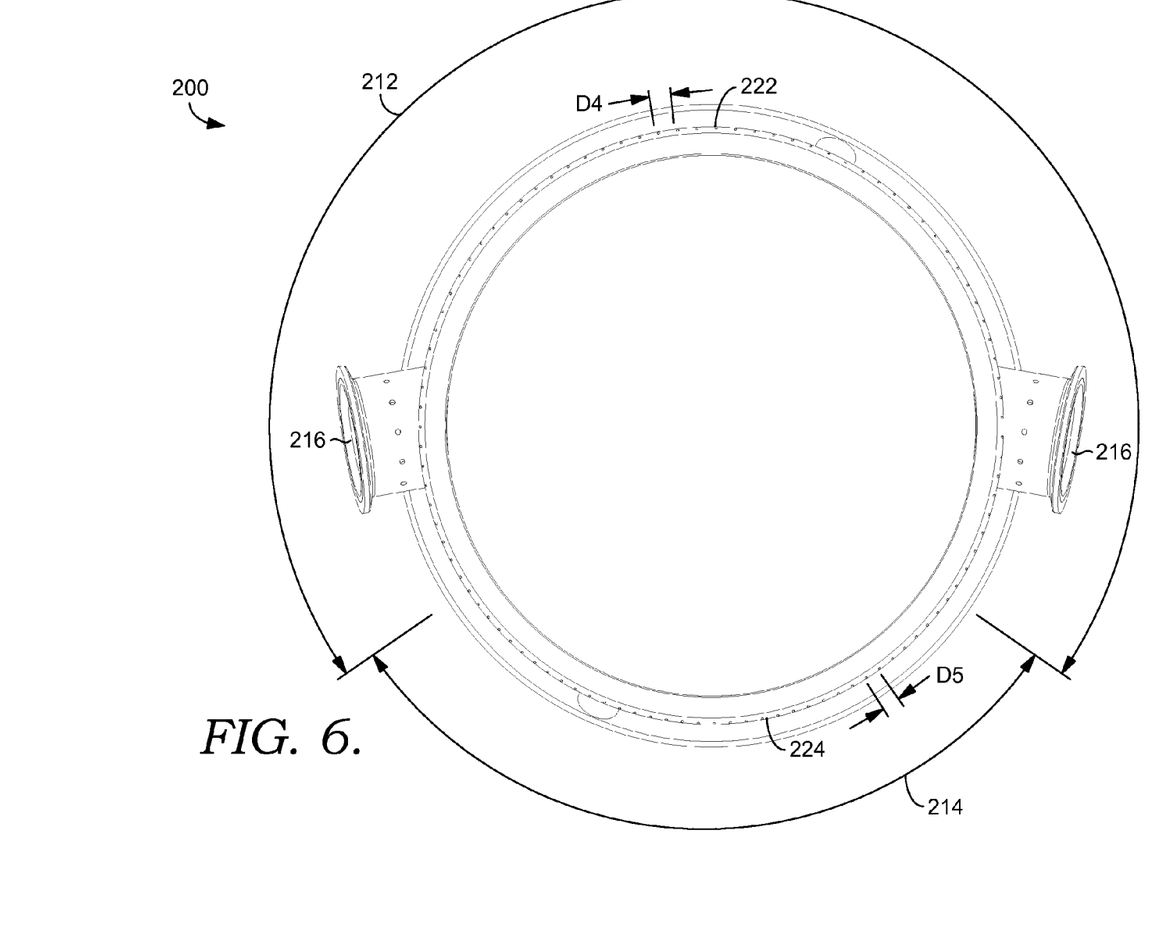
FIG. 6 is a cross section view of the combustion liner of FIG. 5A taken through a row of cooling holes in accordance with an embodiment of the present invention.
Figure 7:
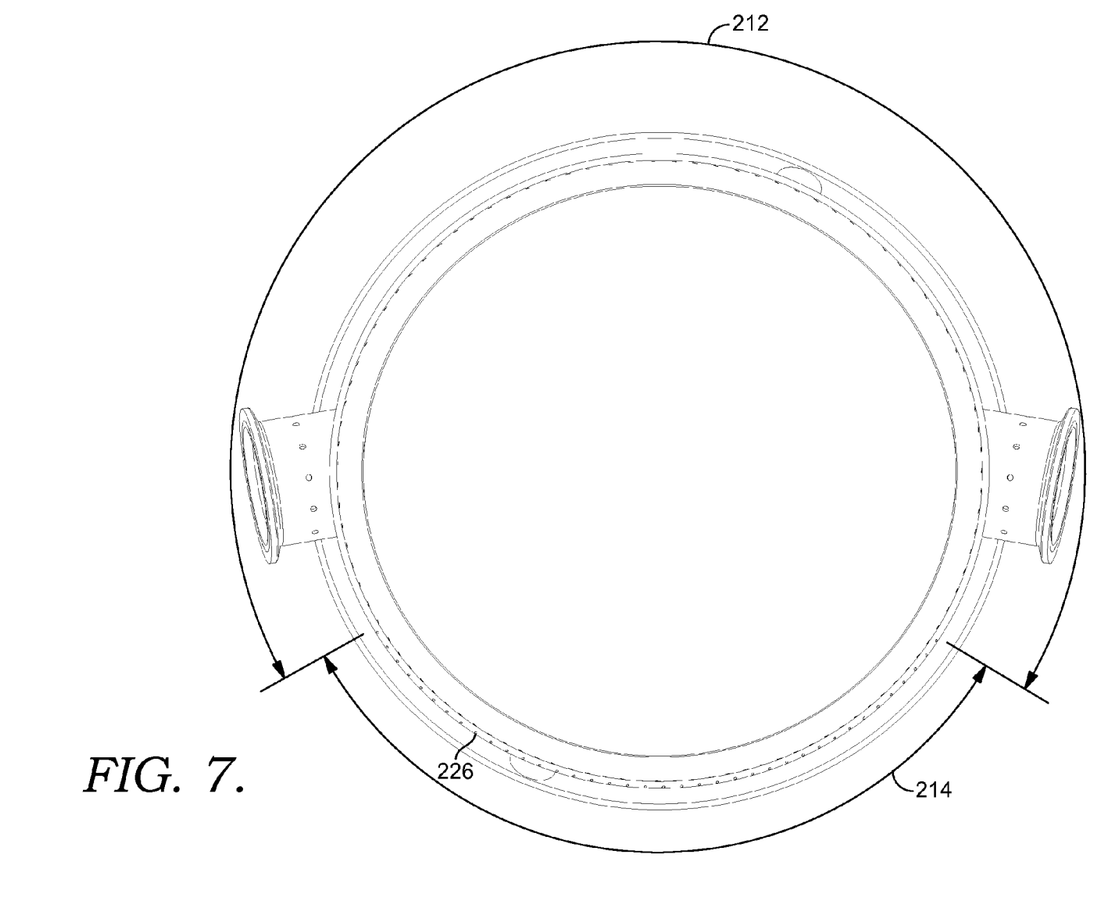
FIG. 7 is an alternate cross section view of the combustion liner of FIG. 5A taken through a different row of cooling holes in accordance with an embodiment of the present invention.

Referring now to FIGS. 5B and 7, for an embodiment of the present invention, the third set of axially spaced rows 226 comprise at least two rows of cooling holes where the rows 226 are positioned between the second set of axially spaced rows 224. The third set of axially spaced rows 226 provide an increase in the quantity and density of cooling holes to the lower portion 214 and extend across the entire lower portion 214, which for the embodiment shown in FIGS. 5-9B is approximately 120 degrees.

As discussed above, prior art combustion liners incorporated three rows of axially spaced cooling holes with each of the holes equally spaced about the liner. The improvements presented in the present invention do not alter the total amount of compressed air used for cooling the combustion liner. That is, no additional air that is not already intended for that area of the combustion liner is directed to the lower portion 214 to enhance cooling. Instead, the combustion liner cooling pattern and method disclosed herein provide a way to more effectively use the non-uniform cooling air distribution by redistributing the cooling air.

In order to improve the effectiveness of the cooling holes 220, the cooling holes are oriented in a way so as to increase the length of the hole, thereby increasing the effectiveness of the cooling air. In each of the first, second, and third set of axially spaced rows, the cooling holes 220 are oriented with at least a surface angle relative to the centerline B-B of the annular body 202. The surface angle can vary in size, but is preferably an acute angle. One such acceptable surface angle for cooling holes 200 is approximately 25 degrees.

Figure 8A:
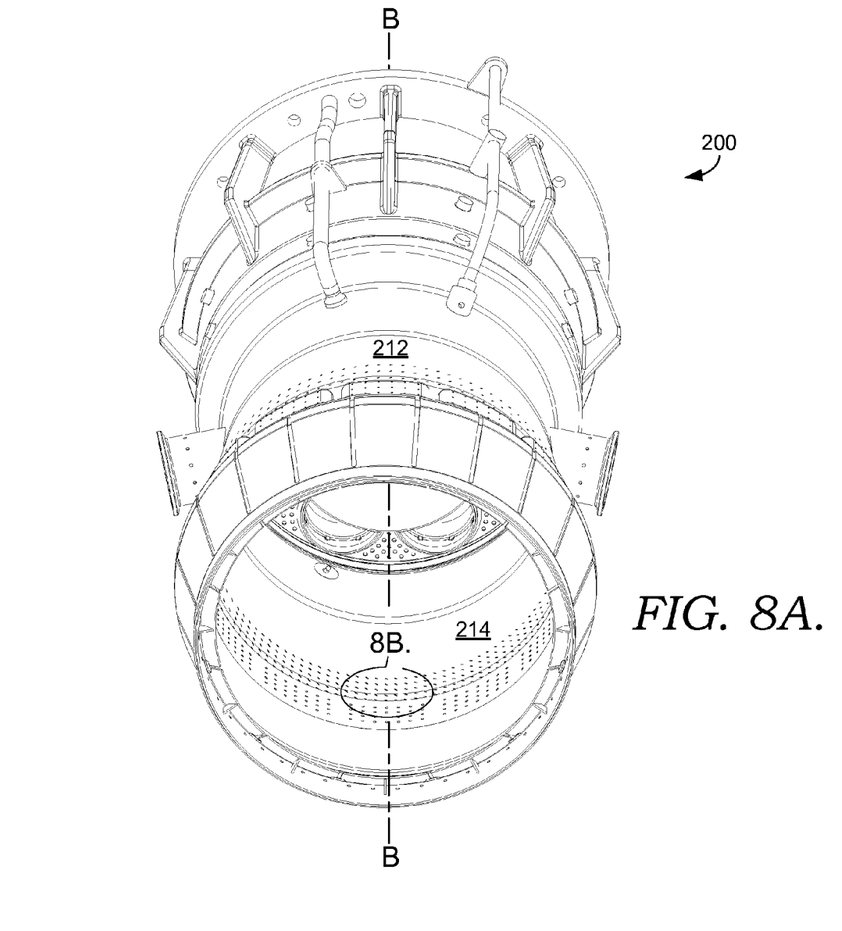
FIG. 8A is a perspective view of a combustion liner in accordance with an embodiment of the present invention.
Figure 8B:
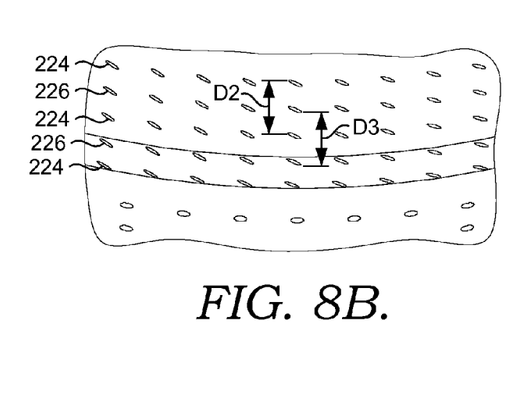
FIG. 8B is a detailed perspective view of a portion of the combustion liner of FIG. 8A in accordance with an embodiment of the present invention.
Figure 9A:
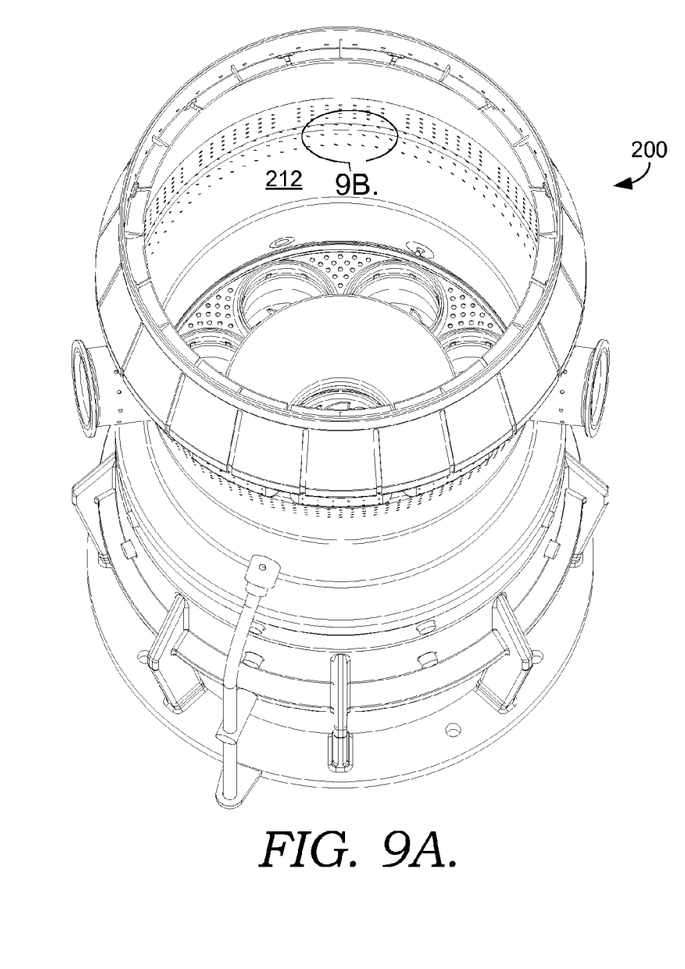
FIG. 9A is an alternate perspective view of a combustion liner in accordance with an embodiment of the present invention; and, FIG. 9B is a detailed perspective view of a portion of the combustion liner of FIG. 9A in accordance with an embodiment of the present invention.
Figure 9B:
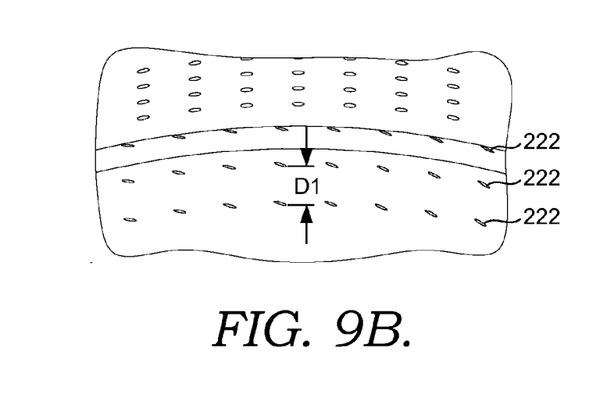

In addition to a surface angle relative to centerline B-B, each of the first, second, and third set of axially spaced rows can also be oriented at a tangential angle relative to the centerline B-B, as shown in FIGS. 8B and 9B. While the tangential angle can vary, it is preferred that the tangential angle be approximately 15 to 75 degrees. One such acceptable tangential angle for the cooling holes 220 is approximately 45 degrees. The combination of a surface angle and a tangential angle increase the overall length and performance of the cooling holes 220.

Depending on the operating conditions of the combustion liner 200, the combustion liner can also comprise a thermal barrier coating applied to the inner wall 204 where the coating extends from proximate the plurality of openings 216 to the outlet end 210. The thermal barrier coating provides an insulation to the inner wall of the combustion liner against the hot combustion gases in order to help lower the effective operating temperature of the combustion liner 200. A variety of thermal barrier coating compositions and thicknesses can be applied to the inner wall 204 of the combustion liner 200.

In an alternate embodiment of the present invention, a cooling pattern for a combustion liner is provided. The cooling pattern comprises a first set of axially spaced rows 222 of cooling holes 220 that are located in an upper portion 212 of the combustion liner 200. As shown in FIGS. 5B and 9B, the first set of axially spaced rows 222 are spaced a first distance D1 apart. The cooling pattern also comprises a second set of axially spaced rows 224 of cooling holes 220 where the second set of axially spaced rows 224 are located in a lower portion 214 of the combustion liner 200. As shown in FIGS. 5B and 8B, the second set of axially spaced rows 224 are spaced a second distance D2 apart. Although the distances D1 and D2 can vary depending on the combustion liner operating requirements, for the embodiment of the present invention shown in FIG. 5B, D1 is equal to D2, such that the first set and second set of axially spaced rows 222 and 224 are in axial alignment.

The cooling pattern also comprises a third set of axially spaced rows 226 of cooling holes 220, where the third set of axially spaced rows 226 are located in the lower portion 214 of the combustion liner 200. Referring also to FIGS. 5B and 8B, the third set of axially spaced rows 226 are spaced a third distance D3 apart. As shown in FIGS. 5A, 5B, and 8B, the third set of axially spaced rows 226 are positioned axially between the second set of axially spaced rows 224. More specifically, the third set of axially spaced rows 226 are positioned generally equidistant between the second set of axially spaced rows 224. Therefore, for the embodiment of the present invention depicted in FIG. 5B, D3 is generally equal to D2, however, these distances can again vary depending on the required cooling requirements of the combustion liner.

Cooling effectiveness is also affected by the spacing and number of the cooling holes within each of the axially spaced rows. For an embodiment of the present invention, the cooling pattern has the cooling holes 220 in the first set of axially spaced rows 222 equally spaced at a distance D4. As for the second set and third set of axially spaced rows 224 and 226, there is also an equal number of cooling holes 220 in each of these rows, however the spacing in these rows is more closely positioned at a distance D5 so as to increase the hole density for improving the cooling. For example, for the embodiment of the present invention depicted in FIGS. 5A-7, the cooling holes in the first set of axially spaced rows 222 (those in the upper portion 212) are spaced equally at a distance D4 of approximately 0.4 inches apart, whereas the cooling holes in the second and third sets of axially spaced rows 224 and 226 (those in the lower portion 214) are spaced equally, but at a closer distance D5 of approximately 0.33 inches. As one skilled in the art will understand, the exact size of the cooling holes and spacings D4 and D5 will vary. Therefore, as a result of the above-described spacing of cooling holes and rows of cooling holes, the cooling flow to the lower portion 214 of the combustion liner 200 is increased.

As discussed above, the plurality of cooling holes can be oriented at both a surface angle and a tangential angle in order to more effectively utilize the cooling air. This cooling hole orientation is also utilized in the cooling pattern for a combustion liner discussed above.

The present invention also provides a method of increasing cooling to a portion of a combustion liner comprising providing a generally annular body with an upper portion and a lower portion, where the lower portion is a part of the combustion liner positioned closest to a centerline of the gas turbine engine when installed. The method also comprises providing a first plurality of rows of cooling holes in the upper portion and providing a second plurality of rows of cooling holes in the lower portion of the combustion liner, where the second plurality of rows are in axial alignment with the first plurality of rows of cooling holes. The method further comprises providing a third plurality of rows of cooling holes also in the lower portion of the combustion liner, where the third plurality of rows is disposed between the second plurality of rows. The cooling holes in the second plurality and third plurality of rows are spaced such that they are located at a closer interval, or distance, than the spacing between the cooling holes in the first plurality of rows. The cooling holes in the above-disclosed method are spaced so as to more effectively utilize and apply the same amount of cooling air utilized in the prior art. For example, the cooling holes in the first plurality of rows are equally spaced as a first distance apart, while the second plurality of rows are also equally spaced, but at a second distance apart. Furthermore, the cooling holes in the third plurality of rows are equally spaced at a third distance apart. The first, second, and third distances can very, however, for an embodiment of the present invention, the second distance and third distance are equal, while the first distance is greater than the second or third distances. As a result, a greater concentration of cooling holes are present in the lower portion of the combustion liner in order to provide the additional cooling required to lower the operating temperatures in the liner and compensate for the misdistribution of cooling air supplied to the combustion liner.

The present invention has been described in relation to particular embodiments, which are intended in all respects to be illustrative rather than restrictive. Alternative embodiments and required operations, such as machining of shroud faces other than the hardface surfaces and operation-induced wear of the hardfaces, will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A combustion liner for a gas turbine combustor comprising:
  a generally annular body having an inner wall, an outer wall spaced a distance from the inner wall, an inlet end, and an opposing outlet end, the generally annular body also having a plane extending through a centerline to bisect the generally annular body and define an upper portion and a lower portion of the generally annular body;
  a seal positioned along the outer wall proximate the outlet end;
  the upper portion having a plurality of cooling holes, the upper portion having a lower boundary defined by the plane extending through the centerline, a left boundary defined by a column of one or more cooling holes most near to the inlet end, and a right boundary defined by a column of one or more cooling holes most near to the outlet end;
  the lower portion having a plurality of cooling holes, the lower portion having an upper boundary defined by the plane extending through the centerline, a left boundary defined by a column of one or more cooling holes most near to the inlet end, and a right boundary defined by a column of one or more cooling holes most near to the outlet end, wherein the lower portion comprises a section of the generally annular body that is positioned closer to an engine axis upon installation of the combustion liner in the gas turbine engine; and
  wherein the entire lower portion of the generally annular body has a higher concentration of cooling holes than the entire upper portion of the generally annular body.

2. The combustion liner of claim 1, wherein the plurality of cooling holes are arranged in a plurality of axially spaced rows, the plurality of axially spaced rows comprising:
  a first set of axially spaced rows located in the upper portion of the generally annular body;
  a second set of axially spaced rows located in the lower portion of the generally annular body; and
  a third set of axially spaced rows located in the lower portion of the generally annular body;
  wherein the first set of axially spaced rows and the second set of axially spaced rows each comprise at least three rows and the second set of axially spaced rows are in axial alignment with the first set of axially spaced rows.

3. The combustion liner of claim 2, wherein the third set of axially spaced rows comprise at least two rows with each row positioned between one of the second set of axially spaced rows.

4. The combustion liner of claim 2, wherein the third set of axially spaced rows extend approximately 120 degrees across the lower portion of the generally annular body.

5. The combustion liner of claim 1 further comprising a thermal barrier coating applied to the inner wall from proximate the plurality of openings to the outlet end.

6. The combustion liner of claim 1, wherein the plurality of cooling holes are oriented at a surface angle relative to the plane extending through the centerline of the generally annular body.

7. The combustion liner of claim 6, wherein the plurality of cooling holes are also oriented at a tangential angle relative to the plane extending through the centerline of the generally annular body.

8. A cooling pattern for a combustion liner having a generally annular body, the cooling pattern comprising:
  a first set of axially spaced rows, the first set of axially spaced rows spaced a first distance apart;
  a second set of axially spaced rows, the second set of axially spaced rows spaced a second distance apart;
  a third set of axially spaced rows, the third set of axially spaced rows spaced a third distance apart;
  an upper half having a lower boundary defined by a plane extending through a centerline, a left boundary defined by a left-most row in the first set of axially spaced rows, and a right boundary defined by a right-most row in the first set of axially spaced rows;

a lower half having an upper boundary defined by the plane extending through the centerline, a left boundary defined by a left-most row in the second set of axially spaced rows, and a right boundary defined by a right-most row in the second set of axially spaced rows; and wherein the second set of axially spaced rows and the third set of axially spaced rows are arranged such that of the entire lower half of the combustion liner has a higher concentration of cooling holes than the entire upper half of the combustion liner.

9. The cooling pattern of claim 8, wherein the third set of axially spaced rows extend approximately 120 degrees across the lower half of the combustion liner.

10. The cooling pattern of claim 8 further comprising a thermal barrier coating applied to an inner wall of the combustion liner.

11. The combustion liner of claim 8, wherein the first, second and third plurality of rows of cooling holes are oriented at a surface angle relative to the annular body.

12. The combustion liner of claim 11, wherein the first, second, and third plurality of cooling holes are also oriented at a tangential angle relative to the plane extending through the centerline.

13. The cooling pattern of claim 8, wherein the cooling holes are equally spaced in each of the first set of axially spaced rows.

14. The cooling pattern of claim 8, wherein there are an equal number of cooling holes in each of the second set and third set of axially spaced rows of cooling holes.

15. A method of providing increased cooling to a portion of a combustion liner comprising:

providing a generally annular body having a plane extending through a centerline, wherein the plane extending through the centerline bisects the generally annular body and defines an upper portion and a lower portion, where the lower portion is a section of the combustion liner positioned closest to the centerline of a gas turbine engine when the combustion liner is installed in the gas turbine engine;

providing a plurality of cooling holes in the upper portion of the combustion liner, the upper portion having a lower boundary defined by the plane extending through the centerline, a left boundary defined by a column of one or more cooling holes most near to the inlet end, and a right boundary defined by a column of one or more cooling holes most near to the outlet end:

providing a plurality of cooling holes in the lower portion of the combustion liner, the lower portion having an upper boundary defined by the plane extending through the centerline: a left boundary defined by a left-most row in the second set of axially spaced rows, and a right boundary defined by a right-most row in the second set of axially spaced rows; and wherein the plurality of cooling holes are arranged such that the entire lower portion of the generally annular body has a higher concentration of cooling holes than the entire upper portion of the generally annular body.

16. The method of claim 15, wherein the plurality of cooling holes are arranged in a first plurality of rows of cooling holes, a second plurality of rows of cooling holes, and a third plurality of rows of cooling holes, wherein the second and third plurality of rows of cooling holes extend approximately 120 degrees across the lower portion of the generally annular body.

17. The method of claim 16, wherein the cooling holes of the first plurality of rows, second plurality of rows, and third plurality of rows are each oriented at a surface angle relative to an axis of the generally annular body as well as a tangential angle.

18. The method of claim 16, wherein the cooling holes in the first plurality of rows are equally spaced at a first distances apart, the cooling holes in the second plurality of rows are equally spaced at a second distance apart, and the cooling holes in the third plurality of rows are equally spaced at a third distance apart.

19. The method of claim 18, wherein the second distance and the third distance are equal.

20. The method of claim 18, wherein the first distance is greater than the second or third distances.

\* \* \* \* \*